United States Patent
Yang et al.

(10) Patent No.: US 10,865,985 B2
(45) Date of Patent: Dec. 15, 2020

(54) SYSTEM AND METHOD FOR OPERATING A COMBUSTION CHAMBER

(71) Applicant: GENERAL ELECTRIC TECHNOLOGY GMBH, Baden (CH)

(72) Inventors: Shizhong Yang, Windsor, CT (US); Robert Frederick Murphy, Windsor, CT (US); Jilin Tu, Baden (CH); Xiaoleinmn Shi, Niskayuna, NY (US); Dayu Huang, Niskayuna, NY (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 187 days.

(21) Appl. No.: 15/899,439

(22) Filed: Feb. 20, 2018

(65) Prior Publication Data
US 2019/0257519 A1    Aug. 22, 2019

(51) Int. Cl.
*F23N 1/02* (2006.01)
*F23L 7/00* (2006.01)
(Continued)

(52) U.S. Cl.
CPC ........... *F23N 1/022* (2013.01); *F02D 35/022* (2013.01); *F02D 41/1453* (2013.01); *F23L 7/007* (2013.01); *F23N 5/006* (2013.01); *F23N 5/082* (2013.01); *F02D 41/1461* (2013.01); *F23L 2900/07006* (2013.01); *F23L 2900/07007* (2013.01); *F23N 2223/40* (2020.01); *F23N 2225/04* (2020.01); *F23N 2229/14* (2020.01);
(Continued)

(58) Field of Classification Search
CPC .... F23N 1/02; F23N 5/00; F23N 2900/05003; F23N 5/08; F23L 7/007
USPC .......................................................... 431/12
See application file for complete search history.

(56) References Cited

U.S. PATENT DOCUMENTS 4,492,559 A * 1/1985 Pocock .................. F23N 5/003
                                                              431/12
6,712,604 B2    3/2004 Havlena
(Continued)

FOREIGN PATENT DOCUMENTS

WO         9634233        10/1996

OTHER PUBLICATIONS

Zheng, et al.; Reducing NOx emission from a Coal-Fired Boiler Based on Regression and Optimization; 2010 2nd Conference on Environmental Science and Information Application Technology.
(Continued)

*Primary Examiner* — Edelmira Bosques
*Assistant Examiner* — Nikhil P Mashruwala
(74) *Attorney, Agent, or Firm* — Grogan, Tuccillo & Vanderleeden, LLP

(57) ABSTRACT

A method for operating a combustion chamber is provided. The method includes obtaining a carbon monoxide reading at an exit of the combustion chamber via a carbon monoxide sensor, and deriving an oxygen set point trim based at least in part on the carbon monoxide reading and a carbon monoxide set point via a controller. The method further includes determining a stability status of the combustion chamber via a combustion stability sensor, and adjusting an oxygen set point of the combustion chamber with the oxygen set point trim based at least in part on the stability status via the controller. The oxygen set point defines a desired oxygen level at the exit of the combustion chamber.

9 Claims, 10 Drawing Sheets

(51) Int. Cl.
*F23N 5/00* (2006.01)
*F23N 5/08* (2006.01)
*F02D 35/02* (2006.01)
*F02D 41/14* (2006.01)

(52) U.S. Cl.
CPC ...... *F23N 2229/20* (2020.01); *F23N 2239/02* (2020.01); *F23N 2900/05001* (2013.01); *F23N 2900/05003* (2013.01)

(56) References Cited

U.S. PATENT DOCUMENTS

| | | | |
|---|---|---|---|
| 7,401,577 B2 | 7/2008 | Saucedo et al. | |
| 7,756,591 B2* | 7/2010 | Jia | G05B 13/048 |
| | | | 110/345 |
| 8,926,317 B2* | 1/2015 | Farrell | F23N 5/16 |
| | | | 431/4 |
| 9,134,026 B2* | 9/2015 | Blaauwwiekel | F23D 14/02 |
| 9,506,649 B2* | 11/2016 | Rennie | F23N 1/022 |
| 9,885,496 B2* | 2/2018 | Karkow | F24H 1/205 |
| 10,096,849 B2* | 10/2018 | Sakai | H01M 8/1213 |
| 2003/0009590 A1* | 1/2003 | Linker | G06N 20/00 |
| | | | 709/241 |
| 2008/0138750 A1* | 6/2008 | Kim | F23N 5/242 |
| | | | 431/12 |
| 2010/0319592 A1 | 12/2010 | Dohalick et al. | |
| 2012/0052450 A1 | 3/2012 | Lou et al. | |
| 2015/0226424 A1* | 8/2015 | Breidenthal | F23C 99/001 |
| | | | 431/8 |
| 2016/0025374 A1* | 1/2016 | Karkow | F24H 1/205 |
| | | | 122/14.22 |
| 2016/0209031 A1 | 7/2016 | Lou et al. | |
| 2018/0306441 A1* | 10/2018 | Bozzuto | F23C 5/32 |
| 2019/0203936 A1* | 7/2019 | Hazzard | F23N 1/022 |
| 2019/0340847 A1* | 11/2019 | Hendrickson | F01N 13/008 |

OTHER PUBLICATIONS

Tanasic, et al.; Experimental Study on the Efficiency of Pulverized Coal-Fired Steam Boiler; Department of process and environmental engineering Univerisity of Belgrade, Faculty of Mechanical Engineering.

Dai, et al.; Model Predictive Control of Post-combustion CO2 Capture System for Coal-fired Power Plants; Proceedings of the 36th Chinese Control Conference Jul. 26-28, 2017.

Zheng, et al.; Reducing NOx emission from a coal-fired boiler based on regression and optimization; Conference Paper Aug. 2010.

* cited by examiner

SYSTEM AND METHOD FOR OPERATING A COMBUSTION CHAMBER

BACKGROUND

Technical Field

Embodiments of the invention relate generally to energy production, and more specifically, to a system and method for operating a combustion chamber.

Discussion of Art

Electrical power grids, also referred to hereinafter simply as "power grids," are systems for delivering electrical energy generated by one or more power plants to end consumers, e.g., business, households, etc. The minimum electrical power drawn/demanded from a power grid by consumers during a given time period, e.g., a day, is known as the "baseline demand" of the power grid. The highest amount of electrical power drawn/demanded from a power grid by consumers is known as the "peak demand" of the power grid, and the time period over which peak demand occurs is typically referred to as the "peak hours" of the power grid. Similarly, the time period outside the peak hours of a power grid is usually referred to as the "off-peak hours" of the power gird. The amount and/or rate of fuel combusted within a fossil fuel based power plant, which usually correlates to the amount of electrical power requested by a power grid connected to the fossil fuel based power plant, is known as the "load" on the fossil fuel based power plant and/or its combustion chamber.

Traditionally, many power grids used only fossil fuel based power plants to satisfy baseline demand. As demand for renewable energy sources continues to grow, however, many power grids now receive significant amounts of electricity from renewable energy sources, e.g., solar, wind, etc. The amount of electricity provided by many renewable energy sources, however, often fluctuates during the course of a day and/or a year. For example, wind based power plants typically contribute more electricity to a power grid at night than during the day. Conversely, solar based power plants typically contribute more electricity to a power grid during the day than at night. While recent developments have made it possible for many renewable energy sources to satisfy the baseline power demand of a power grid during off peak hours, e.g., at night, many power grids still rely on fossil fuel based power plants to satisfy peak demand and/or other periods of increased demand unable to be satisfied by renewable energy sources alone.

Generally, the cost of operating a fossil fuel based power plant positively correlates with the size of the load required to satisfy the demand of a connected power grid, e.g., the higher the demand from the power grid, the more fossil fuel consumed to generate the load to satisfy the demand. Many power grids, however, do not consume the entire load generated by a fossil fuel plant when renewable energy sources are able to meet the baseline demand of the power grid during off peak hours. Shutting down a fossil fuel based power plant, i.e., ceasing all combustion operations, is usually problematic given the relatively short cycles between peak and off peak hours. Accordingly, many fossil fuel based power plants will run/operate at lower/reduced loads when one or more renewable energy sources are able to meet the baseline demand of a power grid, while running/operating at higher loads when the renewable energy sources are unable to satisfy the baseline demand. Due to flame stability issues within the combustion chambers of traditional fossil fuel based power plants, however, such traditional fossil fuel based power plants are able to only reduce their loads down to about fifty to forty percent (50-40%) of their maximum operating load, i.e., the highest load that a fossil fuel based power plant, and/or encompassed combustion chamber, is designed to support/generate. Many power grids presently receive sufficient electricity from renewable sources during off peak hours such that even the 50% reduced loads of many traditional fossil fuel based power plants are not fully consumed. Moreover, because many renewable energy sources are subsidized by various governments, the price of electricity supplied by an encompassing power gird, i.e., the "grid price," is typically too low to be profitable for many traditional fossil fuel based power plants during 50% reduced load operations. Thus, many traditional fossil fuel based power plants suffer environmental and/or economic inefficiency due to their generation of excess load during off peak hours.

Further still, many combustion chambers are limited in their ability to operate at reduced loads due to an inability to accurately monitor flame stability. For example, many traditional combustion chambers are unable to operate safely at loads lower than forty percent (40%) their normal operating load.

Additionally, many traditional combustion chambers will take pulverizers out of services as their loads are reduced. The pulverizers remaining online during reduced operations are generally operated at half their normal feeder speeds in order to avoid the sweeping of fuel from the pulverizers resulting from reduced air requirements to transport the fuel to the combustion chamber. Running a reduced number of pulverizers at a reduced load, however, usually changes the stoichiometric conditions within the combustion chamber, which in turn, also presents additional risks associated with poor transportation of fuel from the pulverizes to the combustion chamber.

Yet further still, traditional combustion chambers usually rely on manually adjusted controls to regulate carbon monoxide ("CO") and/or nitrous oxide ("NOx") as the environmental variables/stoichiometric conditions within the combustion chambers change over time. Manually adjusting controls to regulate CO and NOx emissions, however, is typically inefficient as the effectiveness of such manual controls often depend on the experience of the operators making the adjustments, which usually varies greatly from individual to individual.

What is needed, therefore, is an improved system and method for operating a combustion chamber.

BRIEF DESCRIPTION

As stated above, many combustion chambers are limited in their ability to operate at reduced loads due to an inability to accurately monitor flame stability. Accordingly, embodiments of the present invention provide for improved control feedback loops that adjust a set point for $O_2$ exiting the combustion chamber based on measured CO and flame stability status of the combustion chamber.

For example, in an embodiment, a method for operating a combustion chamber is provided. The method includes obtaining a carbon monoxide reading at an exit of the combustion chamber via a carbon monoxide sensor, and deriving an oxygen set point trim based at least in part on the carbon monoxide reading and a carbon monoxide set point via a controller. The method further includes determining a stability status of the combustion chamber via a combustion stability sensor, and adjusting an oxygen set point of the combustion chamber with the oxygen set point trim based at least in part on the stability status via the controller. The oxygen set point defines a desired oxygen level at the exit of the combustion chamber.

In still yet another embodiment, a system for operating a combustion chamber is provided. The system includes a carbon monoxide sensor, a combustion stability sensor, and a controller. The carbon monoxide sensor is operative to obtain a carbon monoxide reading at an exit of the combustion chamber. The combustion stability sensor is operative to determine a stability status of the combustion chamber. The controller is operative to derive an oxygen set point trim based at least on part on the carbon monoxide reading and a carbon monoxide set point; and adjust an oxygen set point of the combustion chamber with the oxygen set point trim based at least in part on the stability status, the oxygen set point defining a desired oxygen level at the exit of the combustion chamber.

As also stated above, many traditional combustion chambers are limited in their ability to operate at reduced loads due to changes in stoichiometric conditions resulting from a reduction in the number of operating pulverizers. Accordingly, embodiments of the present invention provide for methods of operating a combustion chamber that account for changes in stoichiometric conditions between various firing nozzles within the combustion chamber, which in turn, allows the combustion chamber to operate at lower loads than many traditional combustion chambers.

For example, in an embodiment, a method for operating a combustion chamber is provided. The method includes detecting one or more stoichiometry imbalances between two or more firing nozzles of a plurality via two or more sensors each corresponding to one of the firing nozzles of the plurality. The method further includes adjusting a stoichiometry of at least one of the firing nozzles of the plurality via a controller based at least in part on the detected stoichiometry imbalances.

In still yet another embodiment, a system for operating a combustion chamber is provided. The system includes two or more sensors and a controller. The two or more sensors each correspond to a firing nozzle of a plurality firing nozzles disposed within the combustion chamber. The controller is operative to detect one or more stoichiometry imbalances between the two or more sensors, and to adjust a stoichiometry of at least one of the firing nozzles of the plurality based at least in part on the detected stoichiometry imbalances.

As further stated above, many traditional combustion chambers usually suffer from inefficiencies due to reliance on manual controls to regulate carbon monoxide ("CO") and/or nitrous oxide ("NOx") as the environmental variables/stoichiometric conditions within the combustion chambers change over time. Accordingly, embodiments of the present invention provide for an automated method of operating a combustion chamber that accounts for various metrics/properties, associated with a combustion chamber, to calculate a fireball stability index, which in turn, may be used to adjust/control the stoichiometry conditions within the combustion chamber.

For example, in still yet another embodiment, a method for operating a combustion chamber is provided. The method includes determining a pressure metric of the combustion chamber via a pressure sensor, and determining one or more flame stability metrics for each of a plurality of firing nozzles of the combustion chamber via one or more flame stability sensors. The method further includes determining a fireball metric via a fireball sensor, and calculating a fireball stability index based at least in part on the pressure metric, the one or more flame stability metrics, and the fireball metric.

In still yet another embodiment, a system for operating a combustion chamber is provided. The system includes a pressure sensor, one or more flame stability sensors, a fireball sensor, and a controller. The one or more flame stability sensors each correspond to one of a plurality of firing nozzles disposed within the combustion chamber. The controller is operative to determine a pressure metric of the combustion chamber via the pressure sensor, and to determine one or more flame stability metrics for each nozzle of the plurality. The controller is further operative to determine a fireball metric via the fireball sensor, and to calculate a fireball stability index based at least in part on the pressure metric, the one or more flame stability metrics, and the fireball metric.

DRAWINGS

The present invention will be better understood from reading the following description of non-limiting embodiments, with reference to the attached drawings, wherein below:

DETAILED DESCRIPTION

Figure 1:
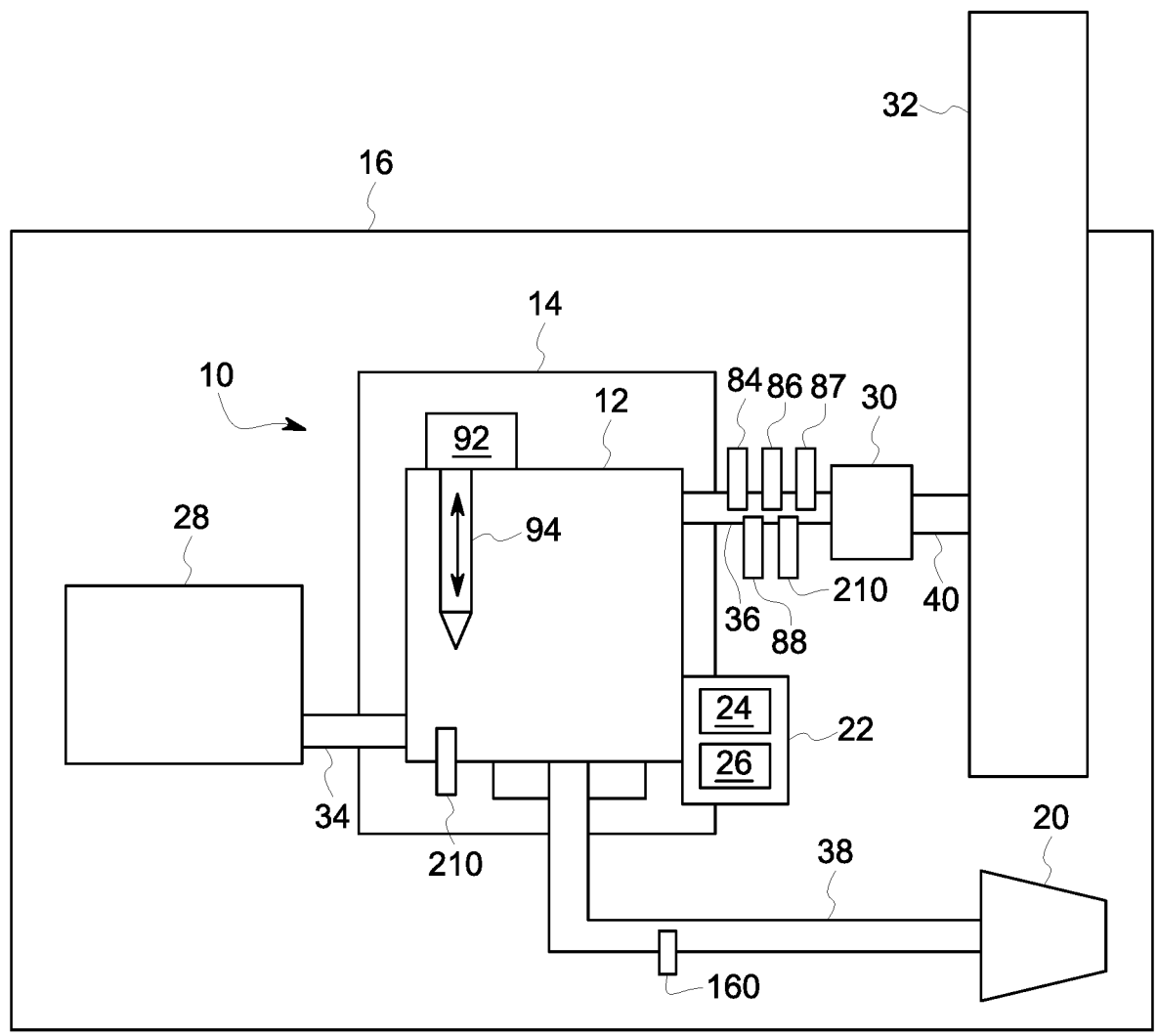
FIG. 1 is a block diagram of a system for operating a combustion chamber, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. The term "real-time," as used herein, means a level of processing responsiveness that a user senses as sufficiently immediate or that enables the processor to keep up with an external process. As used herein, "electrically coupled," "electrically connected," and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid and/or gas flowing between and/or near the referenced elements. Further, the term "stream," as used herein with respect to particles, means a continuous or near continuous flow of particles. As also used herein, the term "heating contact" means that the referenced objects are in proximity of one another such that heat/thermal energy can transfer between them. As further used herein, the terms "suspended state combustion," "combusting in a suspended state," and "combusted in a suspended state" refer to the process of combusting a fuel suspended in air. As used herein with respect to a combustion chamber, the term "flame stability" refers to the likelihood that a fireball within the combustion chamber will combust in a predictable manner. Accordingly, when the flame stability of a combustion chamber is high, the fireball will combust in a more predictable manner than the when the flame stability of the combustion chamber is low. A fireball combusting in an unpredictable manner may vary in intensity and/or stoichiometry, i.e., sputtering, while a fireball combusting in a predictable manner may have a steady intensity and/or stoichiometry. In other words, a fireball combusting in a predictable manner has a more consistent thermal energy output than a fireball combusting in an unpredictable manner.

Additionally, while the embodiments disclosed herein are primarily described with respect to a tangentially fired coal based power plant having a combustion chamber that forms part of a boiler, it is to be understood that embodiments of the invention may be applicable to any apparatus and/or methods that need to limit and/or lower the combustion rate of a fuel without ceasing combustion of the fuel all together, e.g., a furnace.

Referring now to FIG. 1, a system 10 for operating a combustion chamber 12 in accordance with embodiments of the invention is shown. As will be understood, in embodiments, the combustion chamber 12 may form part of a boiler 14, which in turn may form part of a power plant 16 that combusts a fuel 18 (FIG. 2), e.g., a fossil fuel such as coal, oil, and/or gas, to produce steam for the generation of electricity via a steam turbine generator 20. The system 10 may further include a controller 22 having at least one processor 24 and a memory device 26, one or more mills 28, a selective catalytic reducer ("SCR") 30, and/or an exhaust stack 32.

As will be understood, the one or more mills 28 are operative to receive and process the fuel 18 for combustion within the combustion chamber 12, i.e., the mills 28 shred, pulverize, and/or otherwise condition the fuel 18 for firing within the combustion chamber 12. For example, in embodiments, the one or more mills 28 may be pulverizer mills, which as used herein, refers to a type of mill which crushes/pulverizes solid fuel between grinding rollers and a rotating bowl. The processed fuel 18 is then transported/fed from the mills 28 to the combustion chamber 12 via conduit 34.

The combustion chamber 12 is operative to receive and to facilitate combustion of the fuel 18, which results in the generation of heat and a flue gas. The flue gas may be sent from the combustion chamber 12 to the SCR 30 via conduit 36. In embodiments where the combustion chamber 12 is integrated into a boiler 14, the heat from combusting the fuel 18 may be captured and used to generate steam, e.g., via water walls in heating contact with the flue gas, which is then sent to the steam turbine generator 20 via conduit 38.

The SCR 30 is operative to reduce NOx within the flue gas prior to emission of the flue gas into the atmosphere via conduit 40 and exhaust stack 32.

Figure 2:
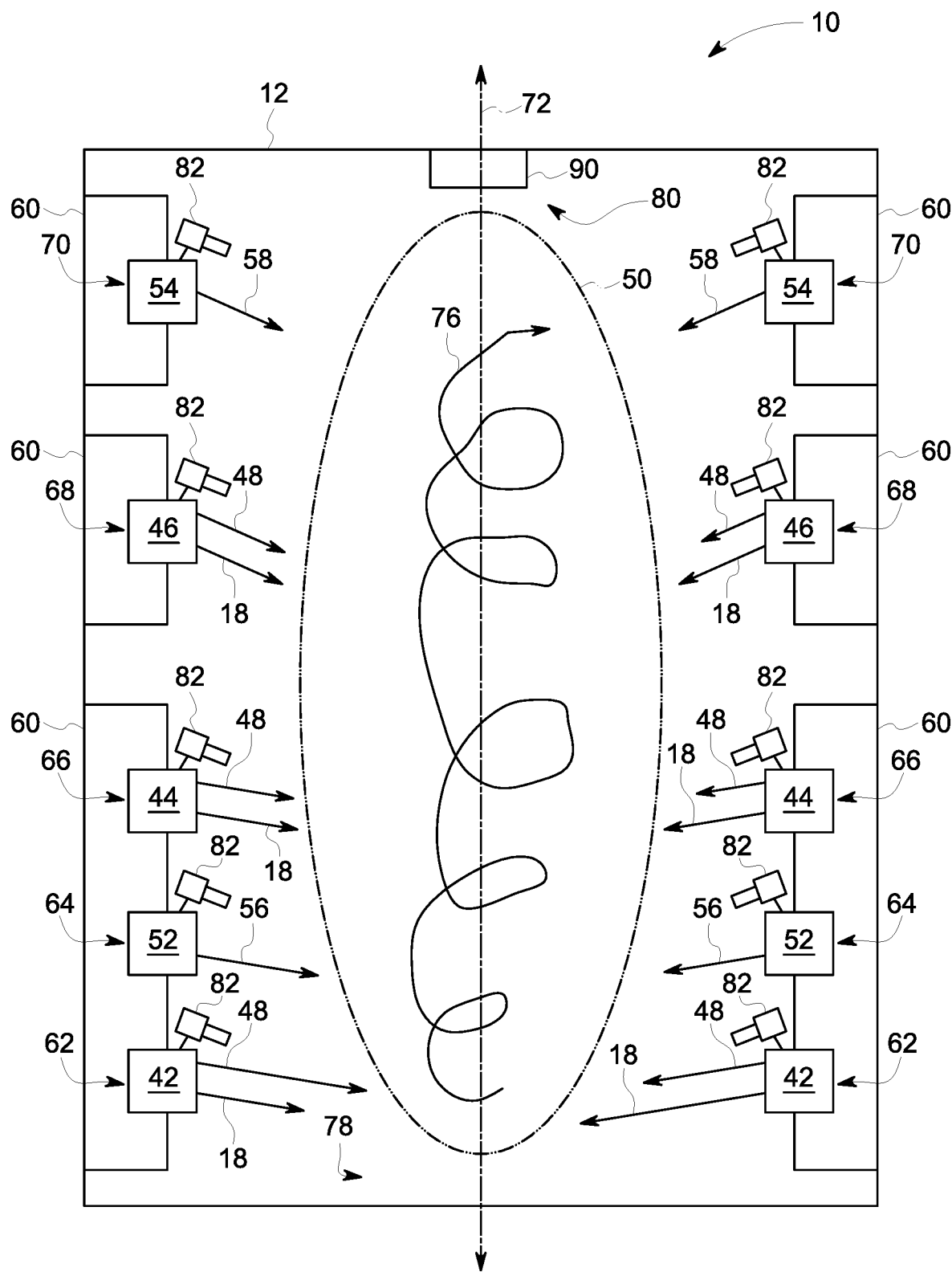
FIG. 2 is a diagram of a combustion chamber of the system of FIG. 1, in accordance with an embodiment of the present invention.

Turning now to FIG. 2, the internals of the combustion chamber 12 are shown. The system 10 further includes a plurality of nozzles 42, 44, and/or 46 which are operative to introduce the fuel 18 into the combustion chamber 12 via primary air streams 48, which may be performed in accordance with a reduced load. In other words, the nozzles 42, 44, and/or 46 introduce the fuel 18 and the primary air 48 into the combustion chamber 12 at rates corresponding to a load that is less than half of the maximum operating load of the combustion chamber 12. As will be understood, the fuel 18 and primary air streams 48 are ignited/combusted after exiting an outlet end of the nozzles 42, 44, and 46 so as to form a fireball 50. The system 10 may include additional nozzles 52 and/or 54 through which secondary air 56 and over-fired air 58 may be introduced into the combustion chamber 12 to control/govern the combustion of the fuel 18 within the fireball 50.

In embodiments, the nozzles 42, 44, 46, 52, and/or 54 may be disposed in one or more windboxes 60 and/or arranged into one or more firing layers 62, 64, 66, 68, and 70, i.e., groups of nozzles 42, 44, 46, 52, 54 disposed at and/or near the same position along a vertical/longitudinal axis 72 of the combustion chamber 12. For example, a first firing layer 62 may include nozzles 42 that introduce the fuel 18 and primary air 48, a second firing layer 64 that include nozzles 52 that introduce secondary air 56, a third 66 and/or a fourth 68 firing layers that include nozzles 44 and 46 that introduce the fuel 18 and primary air 48, and a fifth firing layer 70 that includes nozzles 54 that introduce separated overfired air ("SOFA") 58. While the firing layers 62, 64, 66, 68, and 70 are depicted herein as being uniform, i.e., each firing layer 62, 64, 66, 68, and 70 includes either nozzles 42, 44, 46 that introduce only primary air 48 and the fuel 18, nozzles 52 that introduce only secondary air 56, or nozzles 54 that introduce only SOFA 58, it will be understood that, in embodiments, an individual firing layer 62, 64, 66, 68, and 70 may include any combination of nozzles 42, 44, 46, 52, and/or 54. Further, while FIG. 2 shows five (5) firing layers 62, 64, 66, 68, and 70, it will be understood that embodiments of the invention may include any number of firing layers. Further still, nozzles 52 and/or 54 may be disposed next to and/or directed at nozzles 42, 44, and/or 46 such that the secondary 56 and/or SOFA 58 air directly supplements the primary air 48 at each nozzle 42, 44, and/or 46.

Figure 3:
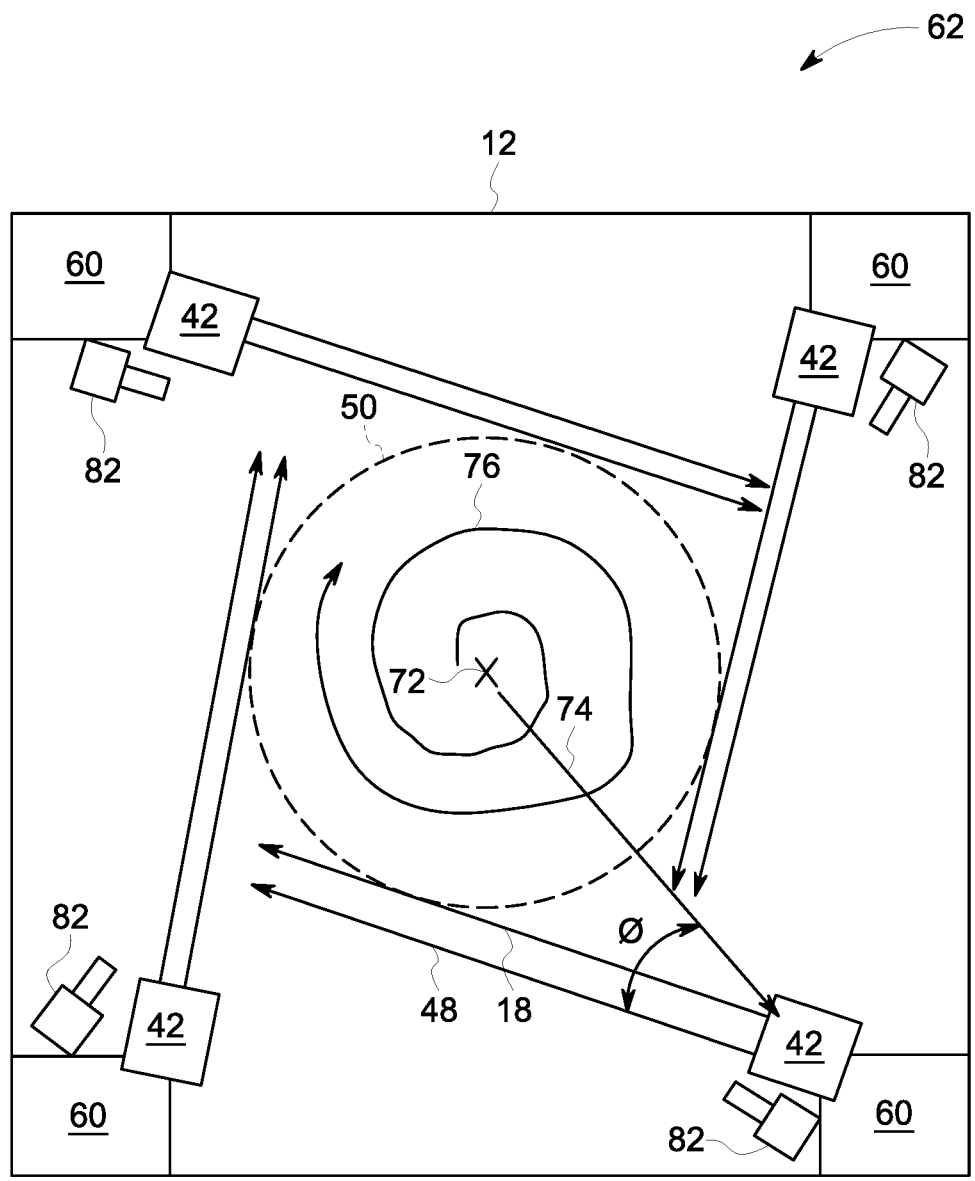
FIG. 3 is a cross-sectional view of a firing layer of the combustion chamber of FIG. 2, in accordance with an embodiment of the present invention.

Moving now to FIG. 3, a cross-sectional view of firing layer 62 is shown. As will be appreciated, in embodiments, the fuel 18 may be tangentially fired, i.e., the fuel 18 is introduced into the combustion chamber via nozzles 42 at an angle Ø formed between the trajectory of the primary air stream 48, and a radial line 74 extending from the vertical axis 72 to the nozzles 42. In other words, the nozzles 42 inject the fuel 18 via the primary air stream 48 tangentially to an imaginary circle 50, representative of the fireball, that is centered on the vertical axis 72. In certain aspects, the angle Ø may range from 2-10 degrees. While FIG. 3 depicts the nozzles 42 within the first firing layer 62 as disposed within the corners of the combustion chamber 12, in other embodiments, the nozzles 42 may be disposed at any point within the firing layer 62 outside of the fireball 50. As will be understood, the nozzles 44, 46, 52, and/or 54 (FIG. 2) of the other firing layers 64, 66, 68, and/or 70 (FIG. 2) may be oriented in the same manner as the nozzles 42 of first firing layer 62 shown in FIG. 3.

Returning back to FIG. 2, upon leaving the nozzles 42, 44, and/or 46, the combusting particles of the fuel 12 follow a helix shaped flight path 76, e.g., a corkscrew, within the fireball 50 as they flow in a direction moving from an upstream side 78 of the combustion chamber 12 to a downstream side 80 of the combustion chamber 12. In other words, tangentially firing the fuel 18 causes the fireball 50 to spiral about the vertical axis 72.

As will be understood, in embodiments, the combustion chamber 12 is operated at a normal load, i.e., 60-100% of its maximum load, during periods when renewable energy sources connected to the same power grid as the power plant 16 are unable to meet baseline demand. When the renewable energy sources connected to the power gird are able to meet baseline demand, the controller 22 may operate the combustion chamber 12 at a reduced load, e.g., less than 50% of its maximum load, by reducing the amount of fuel 18, primary air 48, secondary air 56, and/or SOFA 58 introduced into the combustion chamber 12. As will be appreciated, however, a minimal amount of air provided by the primary air 48, secondary air 56, and/or SOFA 58 must be maintained in order to facilitate movement of the fuel 18 through the combustion chamber 12. Thus, in embodiments, the aforementioned minimal amount of air may be a lower constraint on the ability of the controller 22 to reduce the load of the combustion chamber 12. For example, in embodiments, the primary air 48 may be supplied to each nozzle 42, 44, and/or 46 at between about 1-1.5 lbs/lb of fuel, and the controller 22 may adjust the secondary 56 and/or SOFA 58 such that the total amount of air available at each nozzle 42, 44, and/or 46 for combustion of the fuel 18 is about 10.0 lbs/lb of fuel.

As stated above, operating the combustion chamber 12 at a reduced load risks lowering the flame stability of the combustion chamber 12, i.e., there is an increased risk that the fireball 50 may begin to combust in a more unpredictable manner. In particular, the flame stability of the combustion chamber 12 is based at least in part on the stoichiometry of one or more of the nozzles 42, 44, and/or 46. As used herein, the stoichiometry of a nozzle 42, 44, and/or 46 refers to the chemical reaction ratios of the primary air 48 and the fuel 18, and in some embodiments, the ratio of the secondary air 56 and/or SOFA 58 consumed by combustion of the fuel 18 at the nozzles 42, 44, and/or 46. As will be appreciated, reduction of the fuel 18, primary air 48, secondary air 56, and/or SOFA 58 by the controller 22 in order to reduce the load on the combustion chamber 12 in turn changes the stoichiometry of one or more of the nozzles 42, 44, and/or 46.

Accordingly, and as also shown in FIGS. 1 and 2, the system 10 further includes one or more sensors 82 (FIG. 2), 84 (FIG. 1), 86 (FIG. 1), 87 (FIG. 1), 88 (FIG. 1), and 90 (FIG. 2) in electronic communication with the controller 22 and operative to obtain stoichiometric data, i.e., data related to the stoichiometry of the products and reactants of the combustion reaction at the nozzles 42, 44, and/or 46, via measuring/monitoring the stoichiometry of at least one of the nozzles 42, 44, 46 that introduces the primary air 48 and the fuel 18, and/or chemicals within the generated flue gas, which may be performed in real-time. For example, in embodiments, the sensors 82 and/or 90 may be combustion stability sensors, e.g., cameras, operative to obtaining visual images/video feeds of the fireball 50. In other embodiments, the sensors 82 and/or 90 may obtain spectral lines of the fireball 50 corresponding to stoichiometric data. As will be understood, the intensities of the spectral lines may correspond to a stoichiometric amount of a product and/or reactant of the combustion reaction for a nozzle 42, 44, 46. In other words, the spectral lines provide an indication of the stoichiometry of each of the nozzles 42, 44, 46. As will be further understood, the intensities of the spectral lines may fluctuate over time as a result of furnace rumble, which may be between about twenty (20) to about two-hundred (200) cycles per second, thereby producing a waveform that has an amplitude and frequency.

As will be appreciated, changes in the frequency and/or amplitude of the spectral line fluctuations may provide an indication that the flame stability of the combustion chamber 12 is, and/or is trending towards becoming, unstable. Thus, in embodiments, the stoichiometry of one or more of the nozzles 42, 44, 46 may be adjusted if the frequency and/or amplitude of the spectral line fluctuations exceeds a threshold. For example, a change in the frequency and/or amplitude of the spectral line fluctuations of between about 20% to about 25% from baseline frequency and/or amplitude, i.e., the frequency and/or amplitude of the spectral line fluctuations under normal load operations, may indicate that the flame stability of the combustion chamber 12 is unstable, and/or is trending towards becoming unstable.

Accordingly, by measuring the stoichiometry at one or more of the nozzles 42, 44, 46, the controller 22 can detect that the flame stability of the combustion chamber is and/or is trending towards becoming unstable, and then correct/maintain the flame stability of the combustion chamber 12 by adjusting the individual stoichiometries of one or more of the nozzles 42, 44, and/or 46. As will be understood, the controller 22 may adjust the stoichiometry of the nozzles 42, 44, and/or 46 by adjusting the amount of primary air 48 and/or fuel 18 fed/delivered to the nozzles 42, 44, and/or 46. Thus, in embodiments, the sensors 82 allow the controller 22 to maintain and/or increase the flame stability of the combustion chamber 12 by monitoring and adjusting the primary air 48 and/or the fuel 18 of one or more of the nozzles 42, 44, and/or 46 in real-time. The controller 22 may also adjust the secondary air 56 and/or the SOFA 58 to adjust the stoichiometry at one or more of the nozzles 42, 44, and/or 46.

As will be appreciated, in embodiments, the sensors 82 may be spectral analyzers that measure the stoichiometry at a particular nozzle 42, 44, and/or 46 by analyzing the frequencies of the photons emitted by the combustion of the primary air 48 and the fuel 18 introduced into the combustion chamber 12 by the nozzle 42, 44, and/or 46. In such embodiments, the sensors 82 and 90 may also serve as flame detectors, i.e., devices that ensure that the fuel 18 and primary air 48 at a particular nozzle 42, 44 and/or 46 are in fact combusting.

In other embodiments, the sensors may be CO sensors/detectors 84 (FIG. 1), Oxygen ("$O_2$" sensors) 86, carbon dioxide ("$CO_2$") sensors/detectors 87 (FIG. 1), and/or NOx detectors/sensors 88 (FIG. 1) located downstream of the combustion chamber 12 that are capable of determining the stoichiometry of one or more of the nozzles 42, 44, and/or 46 by analyzing the amount of CO, $CO_2$, and/or NOx within the generated flue gas.

As will be appreciated, the controller 22 may monitor/measure and/or adjust the stoichiometry of the nozzles 42, 44, and/or 46 via the sensors 82, 84, 86, 87, 88, and/or 90 during normal and/or reduced load operations so as to maintain the flame stability of the combustion chamber 12, i.e., the controller 22 adjusts the stoichiometry of the nozzles 42, 44, and/or 46 so as to mitigate the risk that the flame stability of the combustion chamber will drop to an undesirable level. Accordingly, in embodiments the controller 22 may detect/determine that the flame stability of the combustion chamber 12 is decreasing by sensing fluctuations in the stoichiometry at one or more of the nozzles 42, 44, and/or 46. For example, in embodiments where the sensors 82 are spectral analyzers, fluctuations in the stoichiometry at a nozzle 42, 44, and/or 46 may correspond to variations within spectral lines as measured by the sensors 82 monitoring the stoichiometry at the nozzle 42, 44, and/or 46.

In certain aspects, the controller 22 may adjust the stoichiometries at each of the nozzles 42, 44, and/or 46 such that the stoichiometries at each of the nozzles 42, 44, and/or 46 are substantially uniform with respect to each other. In other words, the controller 22 may ensure that the amount of primary air 48 and fuel 18 delivered to each of the nozzles 42, 44, and/or 46 is substantially the same. For example, if the controller 22 detects via the sensors 82 that the stoichiometry at a first nozzle 42 is higher than the stoichiometry at a second nozzle 44, the controller 22 may either increase the amount of primary air 48 and/or fuel 18 to the second nozzle 44 or decrease the amount of primary air 48 and/or fuel 18 to the first nozzle 42 so that the stoichiometries of the first 42 and the second 44 nozzles are the same/uniform. In embodiments, the controller 22 may adjust the stoichiometries of all of the nozzles, e.g., 46, of a particular firing layer, e.g., 68, so that all of the nozzles on the firing layer are the same/uniform with respect to each other.

Additionally, in embodiments, the system 10 may further include a flame stability/fireball sensor 90 (FIG. 2) which detects/monitors the stability of the fireball 50. For example, in embodiments, the flame stability detector 90 may be a camera mounted to the combustion chamber 12 that looks down the vertical axis 72 at the fireball 50. In such embodiments, dark streaks within the fireball 50, as seen by the flame stability detector 90, may signal that the flame stability of the combustion chamber 12 is degrading. The flame stability sensor 90 may also be a spectral analyzer mounted to the combustion chamber 12 that looks down the vertical axis 72 at the fireball 50 and determines the flame stability based at least in part on analyzing the frequencies of photons emitted by the fireball 50. Thus, in embodiments, the flame stability detector 90 may provide for the detection of extreme low load conditions, i.e., conditions in which the fireball 50 is too unreliable for continued operation of the combustion chamber 12. In other words, the flame stability detector 90 may assist the controller 22 in determining the lowest possible load of the combustion chamber 12.

Further, embodiments of the system 10 may also include an umbrella/telescoping selective non-catalytic reducer ("SNCR") 92 (FIG. 1) in electronic communication with the controller 22 and operative to reduce NOx emissions from the combustion chamber 12. As will be appreciated, the umbrella SNCR 92 includes an adjustable telescoping nozzle 94 (FIG. 1) that allows ammonia, and/or an ammonia forming reagent, to be injected into the combustion chamber 12 at a changing location that has an optimal temperature for NOx reduction, e.g., 1600 F°. While reduced load operations usually result in lower flue gas temperatures, e.g., less than 700 F°, which in turn may lower the efficiency of the SCR 30 to reduce NOx emissions, reduced load operations usually produce less NOx than normal load operations. Thus, as will be appreciated, in embodiments, the increase in NOx reduction provided by the umbrella SNCR 92 is able to compensate for the decrease in NOx reduction by the SCR 30 resulting from the lower flue gas temperatures associated with reduced load operations.

Figure 4:
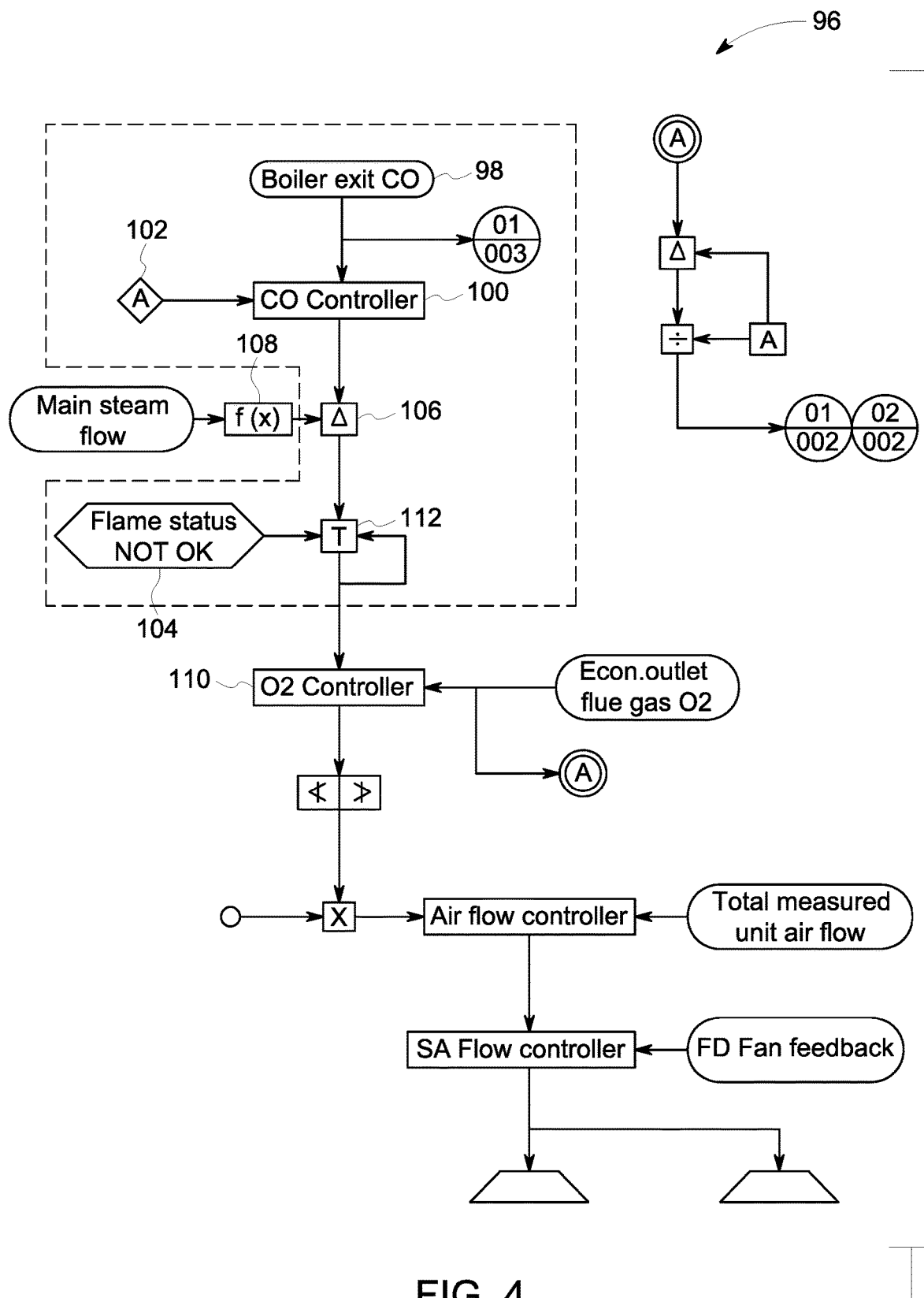
FIG. 4 is a flow chart depicting a method of operating a combustion chamber utilizing the system of FIG. 1, in accordance with an embodiment of the present invention.

Moving now to FIG. 4, a method 96 of operating the combustion chamber 12, in accordance with embodiments of the invention, is shown. The method 96 includes obtaining 98 a CO reading corresponding to/at/and/or near an exit (conduit 36 FIG. 1) of the combustion chamber 12 (FIG. 1) via a CO sensor 84 (FIG. 1) and deriving 100 an $O_2$ set point trim based at least in part on the CO reading and a CO set point 102. The $O_2$ set point trim may be derived/calculated via a CO controller which, in embodiments, may form part of controller 22 (FIG. 1). The term "trim", as used herein with respect to a set point, refers to a value/amount by which the set point is changed over time. For example, if the initial value of an exemplary set point is one-hundred (100) units, the trim for the set point is five (5) units, and if the trim is applied to the set point once per time cycle $t_x$ where x>=1, the set point will be increased by five (5) units each time cycle $t_x$, e.g., the set point will have the following values over $t_0$ to $t_5$: $t_0$=100 units; $t_0$=105 units; $t_2$=110 units; $t_3$=115 units; $t_4$=120 units; and $t_5$=125 units. As will be understood, a trim may have a positive or negative value. As will be understood, in some embodiments, a trim may have a value of zero (0) for one or more time cycles $t_x$.

The method further includes determining 104 a stability status of the combustion chamber 12 via a combustion/flame stability sensor 82 and/or 90 (FIG. 2); and adjusting 106 an $O_2$ set point 108 of the combustion chamber 12 with the $O_2$ set point trim based at least in part on the stability status 104. Thus, as shown in FIG. 4, in embodiments, the CO reading 98 and the CO set point 102 are fed to the CO controller 100 which generates the $O_2$ set point trim which is summed 106 with the $O_2$ set point 108, the value of which is passed to the $O_2$ Controller 110 based on conditions determined 112 by the stability status 104. As will be appreciated, the stability status 104 is a metric that conveys the degree of flame stability with respect to the fireball 50 and/or individual nozzles 42, 44, 46. For example, in embodiments, the adjusted $O_2$ set point 106 may only be passed to the $O_2$ controller 110 if the stability status is above an acceptable threshold, e.g., a user and/or statutory defined level/amount. In some embodiments, the stability status may simply be a flame status, e.g., an indication that a flame, e.g., the fireball, is still present/combusting in the combustion chamber 12. In such embodiments, the flame status may be "present", "absent", "sputtering", "steady", and/or other suitable values.

Thus, by comparing the CO limit/set point with measured CO at the exit, e.g., conduit 36, as shown above, the controller 22 outputs a correction signal to the existing $O_2$ set point, which is typically indexed to the main steam flow, e.g., the current combustion chamber load. The new corrected/adjusted $O_2$ set point may be calculated by subtracting the $O_2$ trim from the existing $O_2$ set point. Thus, the controller 22 will keep looking at the measured CO reading at the exit, e.g., conduit 36, in real-time, or near real-time, and correct the $O_2$ set point in a closed-loop mode so as to maintain emitted CO within limits.

Further, as also shown above, in some embodiments, the corrected/adjusted $O_2$ set point may be sent to transfer block 112 which continuously checks/determines the flame stability using the sensors 82 and/or 90, e.g., cameras. If the flame stability monitors, e.g., sensors 82 and/or 90, indicate poor combustion conditions, then the $O_2$ set point will not be lowered until combustion conditions improve. In such embodiments, the $O_2$ controller 110 may act on the difference between the corrected/adjusted $O_2$ set point and measured $O_2$ at the exit, e.g., conduit 36, and outputs a correction factor (typically 88-120%) for total unit air demand. Comparing the corrected total unit air flow demand with the total measured air flow, an air flow controller generates the flow demand for secondary air, which may be used to control the inlet vanes for one or more fans and/or dampers. For example, if the new $O_2$ set point drops to 2.8% from 3.2% while the current exit $O_2$ is still around 3.2%, then the controller 100 will output a value smaller than 1.0. Thus, the total unit air flow demand will be corrected by a factor of about 0.90, and correspondingly, the air flow controller will respond by adjusting one or more fans and/or dampers to reduce the air flow in order to eventually drive the exiting $O_2$ down to about 2.8%, e.g., equilibrium.

Figure 5:
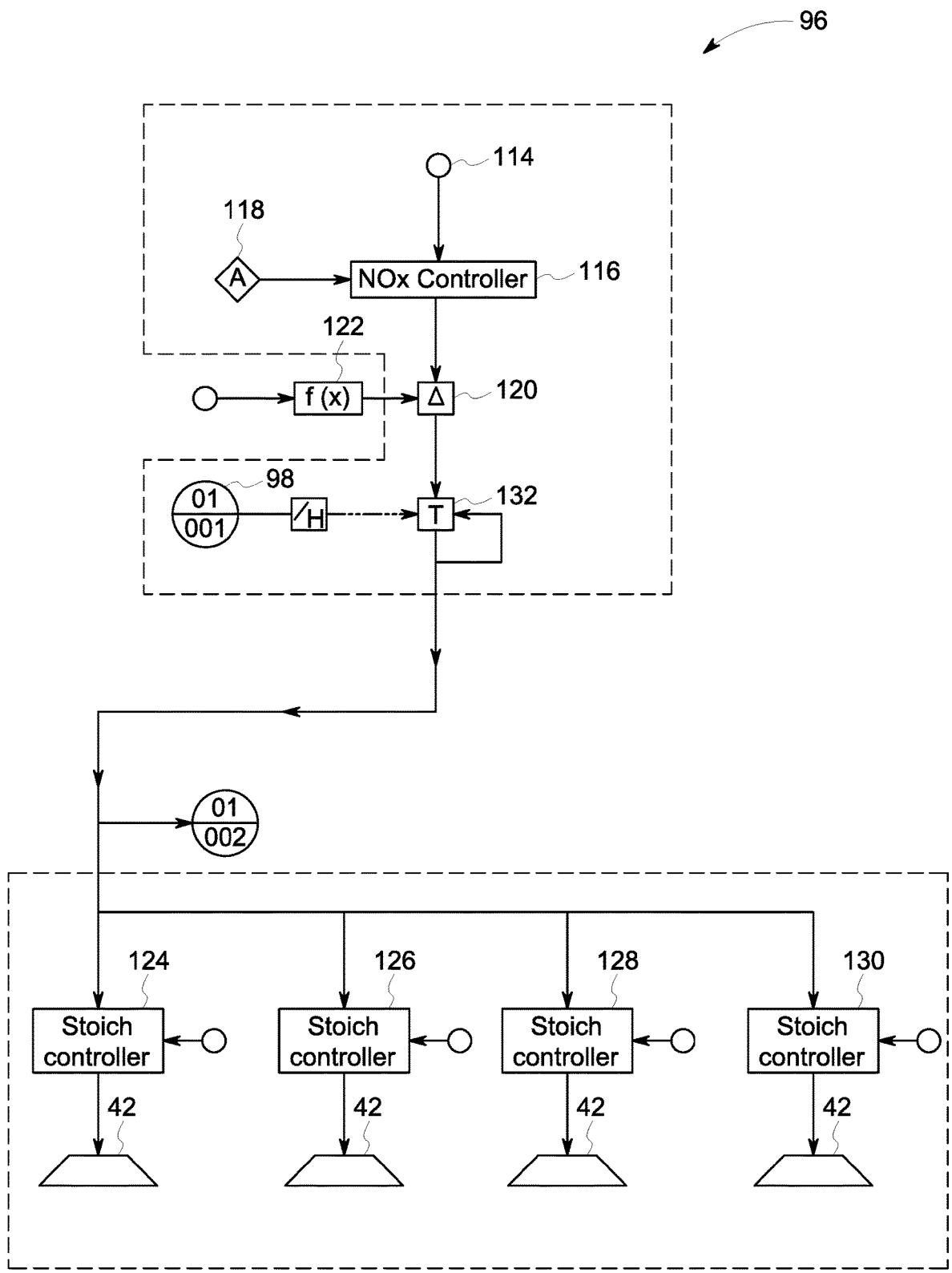
FIG. 5 is another flow chart depicting the method of FIG. 4, in accordance with an embodiment of the present invention.

Turning to FIG. 5, in embodiments, the method 96 may further include obtaining 114 a NOx reading corresponding to/at and/or near the exit (conduit 36 FIG. 1) of the combustion chamber via a NOx sensor 88 (FIG. 1), and deriving 116 a stoichiometry set point trim based at least in part on the NOx reading and a NOx set point 118. The stoichiometry set point trim is then used to adjust 120 a stoichiometry set point 122 based at least in part on the CO reading 98 (FIG. 5). For example, in embodiments, the adjusted stoichiometry set point 120 may not be passed to one or more stoichiometry controllers 124, 126, 128, and 130, which may form part of controller 22 (FIG. 1), unless it is determined 132 that the CO reading 98 is above an acceptable threshold, e.g., a user and/or statutory defined level/amount. As will be appreciated, the stoichiometry controllers 124, 126, 128, and 130, may each correspond/control a different nozzle 42 (FIG. 3) in a firing layer 62, 64, 66, 68, 70 (FIG. 2), and control/adjust a stoichiometry of the corresponding nozzle 42 based at least in part on the received stoichiometry set point 120.

Thus, in embodiments, the NOx controller 116 compares the NOx set point and exiting NOx to generate a correction signal to the existing main boiler zone ("MBZ") stoichiometry set point, which, in embodiments, may be a function of total air flow. As used herein the MBZ refers to the firing layers, e.g., 64, 66, and/or 68 (FIG. 2), where the majority of the combustion within the fireball 50 (FIG. 2) occurs. As lowering the MBZ stoichiometry may increase the amount of CO within the combustion chamber 12, the corrected MBZ stoichiometry set point is sent to a transfer block which monitors the exiting CO continuously. If the exiting CO spikes, the transfer block will ensure that the MBZ stoichiometry set point will not be lowered until the exiting CO recovers. Thus, the corrected MBZ stoichiometry set point out of the transfer block may be used as the set point for low-level stoichiometry controllers.

Figure 6:
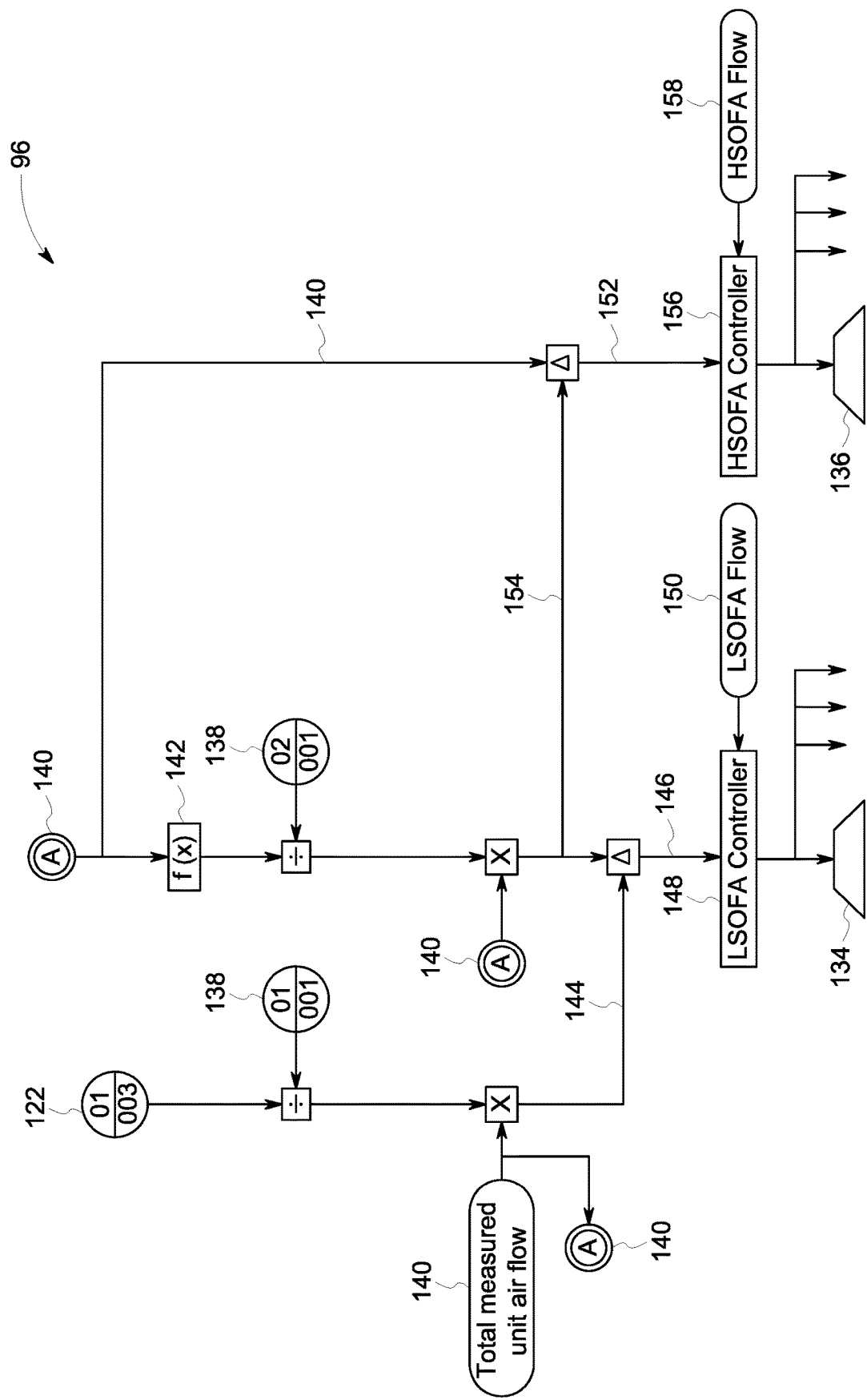
FIG. 6 is yet another flow chart depicting the method of FIG. 4, in accordance with an embodiment of the present invention.

Moving to FIG. 6, as discussed above, in embodiments, the controller 22 may modify the excess air and MBZ stoichiometry, e.g., the stoichiometry set point 122 (FIG. 5) continuously based on feedback from the boiler combustion process, e.g., sensors 82, 84, 86, 88, 90. Thus, the controller 22 (FIG. 1) may further calculate/update the amount of SOFA 58 (FIG. 2) to satisfy the air flow requirements for the combustion chamber 12. In such embodiments, based on a new corrected/updated stoichiometry for the combustion chamber 12 and a new unit stoichiometry calculated/generated based on measured $O_2$, a combustion chamber air flow ratio may be calculated. As will be appreciated, by multiplying the combustion chamber air flow ratio with a total measure unit of air flow, the combustion chamber demand may be determined. In a similar way, the total air flow demand for both the combustion chamber 12 and lower separated overfired air ("LSOFA") may be determined based on the LSOFA stoichiometry setpoint. By subtracting the main burner zone flow demand, the flow demand for the LSOFA zone may can be calculated, which will be sent to the low level LSOFA flow controller to determine the LSOFA damper position demand for each corner and each elevation. Similarly, higher separated overfired air ("HSOFA") demand can be calculated to determine the HSOFA damper position demand for each corner and each elevation.

For example, as shown in FIG. 6, the LSOFA air damper 134 and/or the HSOFA air damper 136 may be controlled based at least in part on the adjusted/corrected the stoichiometry set point 122, a unit stoichiometry 138, a total unit air flow 140, and/or a LSOFA set point 142. In such embodiments, an air flow demand (represented by line 144) may be generated based on the stoichiometry set point 122, the unit stoichiometry 138, and the total unit air flow 140. A LSOFA demand 146 is then generated based on the air flow demand 144, which is then fed to a LSOFA controller 148 along with a LSOFA flow rate 150 to control set the LSOFA air damper 134. Similarly, the HSOFA demand (represented by line 152) may be based on the sum of the combustion chamber air flow demand 144 and the LSOFA demand 146, represented by line 154. The HSOFA demand 152 is then fed to an HSOFA controller 156 along with an HSOFA flow rate 158 which regulates/controls the HSOFA air damper 136.

Figure 7:
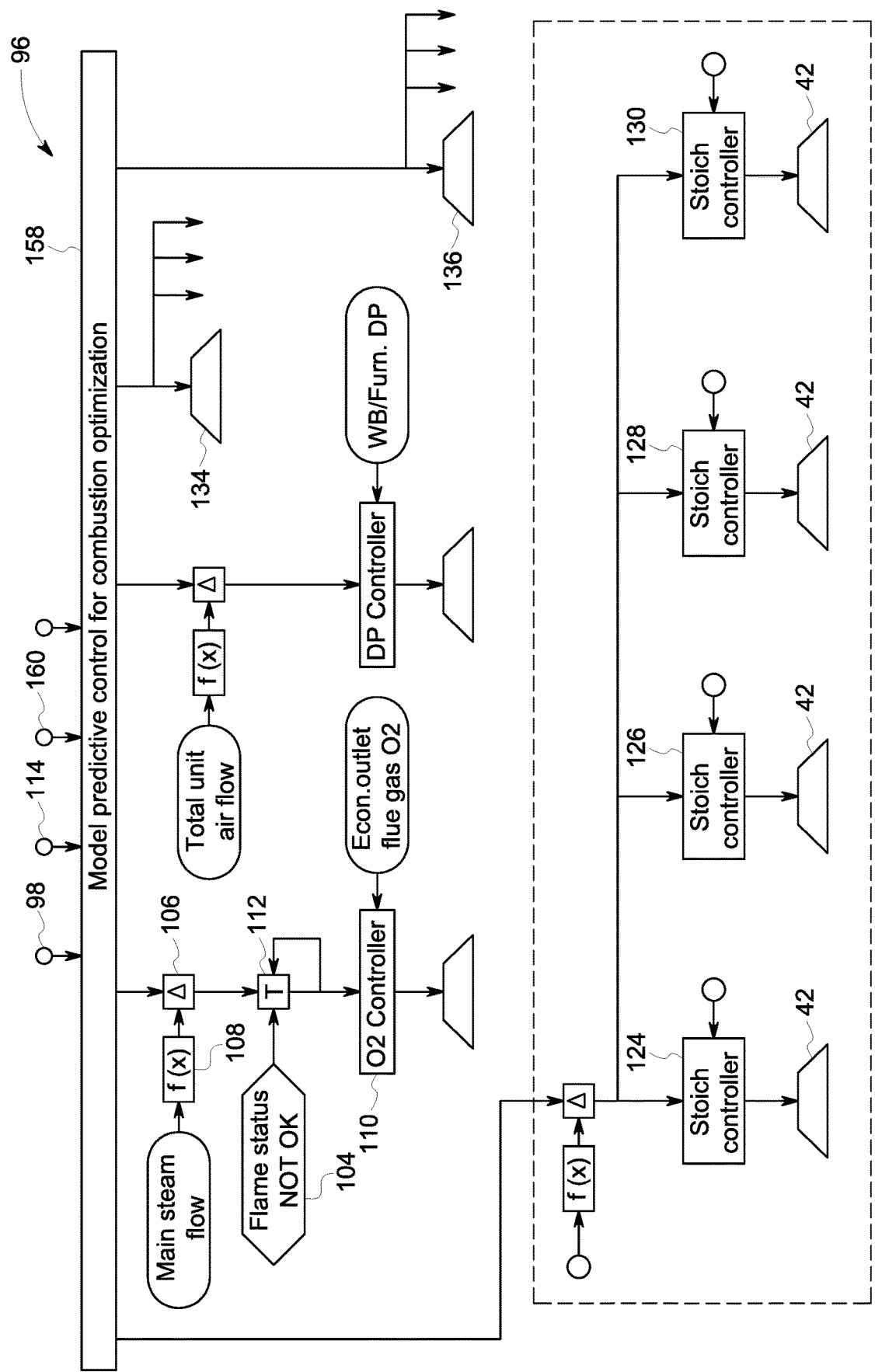
FIG. 7 is yet another flow chart depicting the method of FIG. 4, in accordance with an embodiment of the present invention.

Turning to FIG. 7, in embodiments, deriving the $O_2$ set point trim, (as shown in FIG. 4), deriving the stoichiometry set point (as shown in FIG. 5), and/or controlling the LSOFA and/or HSOFA dampers (as shown in FIG. 6) may be based at least in part on a model predictive controller ("MPC") 158. In such embodiments, the MPC 158 may receive the following as inputs: the CO reading 98, the NOx reading 114, a temperature of steam 160 (also shown in FIG. 1) generated by the combustion chamber 12 (FIG. 1), e.g., super-heated steam and/or reheat steam, and/or other parameters related to operation of the combustion chamber 12 and/or encompassing furnace 14 and/or power plant 16. As will be appreciated, the MPC 158 may handle control optimization for the combustion chamber 12 by calculating/generating optimal set points for regulatory control loops based at least in part on feedback received from key controlled variables such as the CO reading 98, the NOx reading 114, and steam temperature 160. As will be appreciated, unlike traditional combustion chamber controllers which operate on simple feedback loops, the MPC 158 predicts the values of one or more environmental operating parameter of the combustion chamber 12, e.g., exiting NOx, CO, $O_2$, etc.

Figure 8:
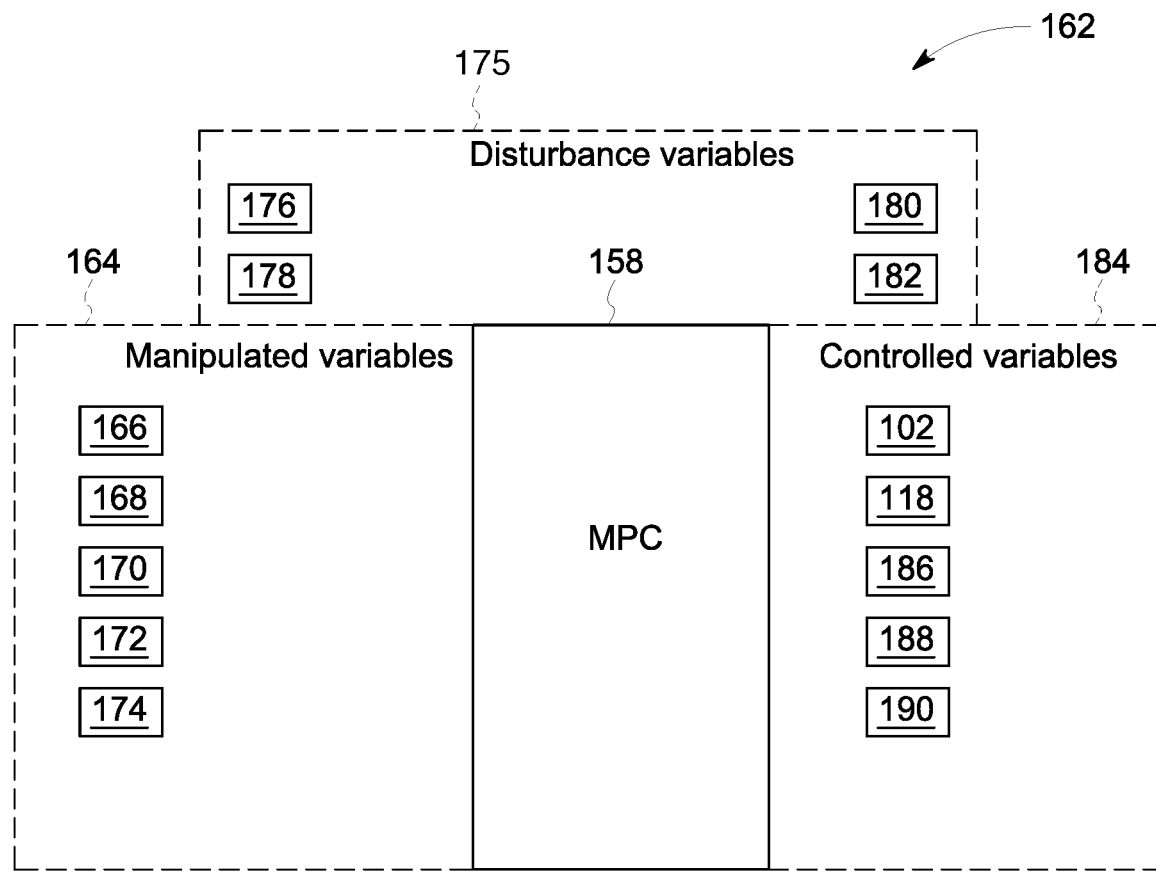
FIG. 8 is a diagram of an input output ("I/O") model utilized by the method of FIG. 4, in accordance with an embodiment of the present invention.

Accordingly, illustrated in FIG. 8 is an embodiment of an input output ("I/O") model 162 utilized by the MPC 158 (FIG. 7). The I/O model 162 may include: manipulated variables 164, e.g., an O2 set point bias 166, a MBZ stoichiometry set point 168, an over fired air damper demand 170, a WB/fum DP set point 172, a wind box tilt 174, etc.; disturbance variables 175, e.g., soot blowing 176, unit load demand 178, fuel properties 180, ambient conditions 182, etc.; and/or controlled variables 184, e.g., the NOx set point 118, the CO set point 102, a SHO temp deviation 186, a RHO temp deviation 188, a RH spray flow rate 190, etc.

Accordingly, the MPC generates and/or regulates the controlled variables 184 based at least in part on the disturbance 175 and/or the manipulated 164 variables.

Figure 9:
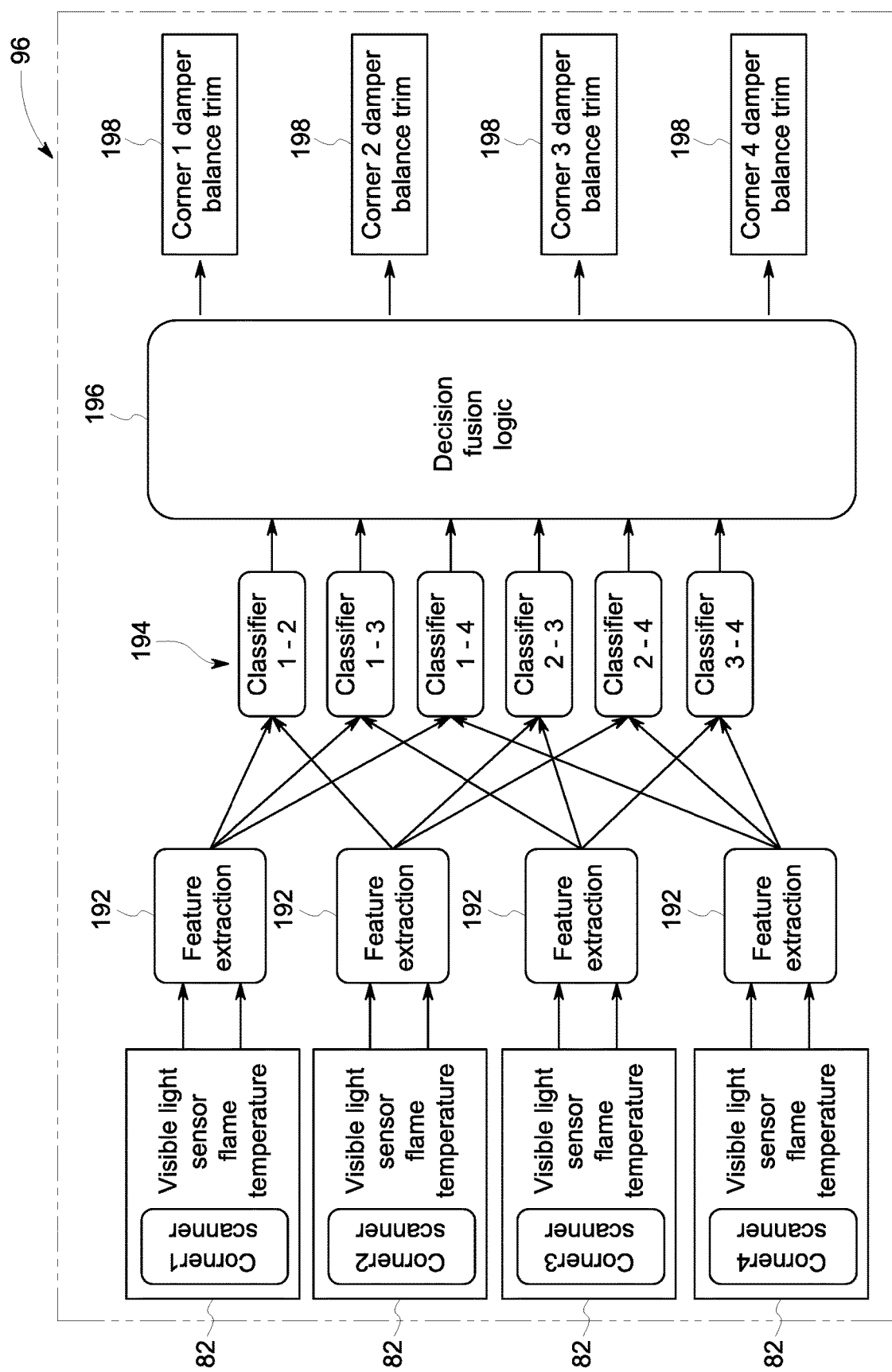
FIG. 9 is yet another flow chart depicting the method FIG. 4, in accordance with an embodiment of the present invention.

As shown in FIG. 9, in embodiments, the method 96 may include detecting one or more stoichiometry imbalances between two or more firing nozzles 42 (FIG. 1) via the sensors 82 (FIG. 2), and adjusting the stoichiometry of at least one of the firing nozzles via the controller 22, which may include the MPC 158 (FIG. 7), in order to obtain a balance in the stoichiometries between the firing nozzles 42. In such embodiments, the controller 22 may obtain/calculate the imbalances between each of the nozzles 42 within a firing layer, e.g., 62 (FIGS. 2 and 3), and classify/group the imbalances into categories, e.g., pairwise classifications. For example, the sensors 82 may include cameras, e.g., photodiodes in the UV, visible, and/or near-infrared light spectrums, and/or temperatures sensors that obtain visible light and/or temperature data of the flame corresponding the firing nozzle 42 to which the sensor 82 is associated with. One or more features 192 may be extracted from the data obtained by the sensors 82 which are used to derive/detect imbalance between the firing nozzles 42, which are then arranged into groups/categories via classifiers 194. The categories are then passed to a decision logic block 196 that seeks to correct the imbalances by adjusting the damper balance trim 198 of one or more of the nozzles 42. While the embodiments herein are depicted as correcting stoichiometry imbalances between groups of nozzles 42 via controlling the amount of air, it is to be understood that other embodiments may correct stoichiometry imbalances via adjusting the fuel supplied to a nozzle 42.

The features 192 may be extracted via power spectral density, wavelets, statistical, and/or other suitable extraction techniques. The categories/groups may include A>>B, A>B, neutral, A<B, A<<B, or undecided, and the classifiers 194 may use any machine learning methods such as logic regression, Support Vector Machine and/or naïve bayes methods. The decision logic block 196 may use the following equations:

Damper Control Optimization:

$$\min \frac{1}{2} \sum_{i=1,n} \left( \frac{x_i}{c_i} - \frac{1}{n} \sum_{j=1,n} \frac{x_j}{c_j} \right)^2$$

$$\text{s.t.} \quad \sum x_i = b$$

wherein: $x_i$ is the air flow from burner i; $c_i$ is the fuel flow from burner i; b is the total air flow; and n is the number of burners.

Gradient Step (Control Signal):

The damper position may be altered/controlled/changed by $$f_i = a_i \Sigma_{j \neq i} \text{classifier}\_\{i,j\} + u$$

where classifier_{i,j} is an output classifier that represents a comparison of air to fuel ratios ("AFR") among burners i and j; u is chosen so that $$\frac{1}{n} \sum_{i=1,n} f_i = 0.$$

An example is classifier $$\text{classifier}_{[i,j]} = \frac{x_i}{c_i} - \frac{x_j}{c_j}.$$

Figure 10:
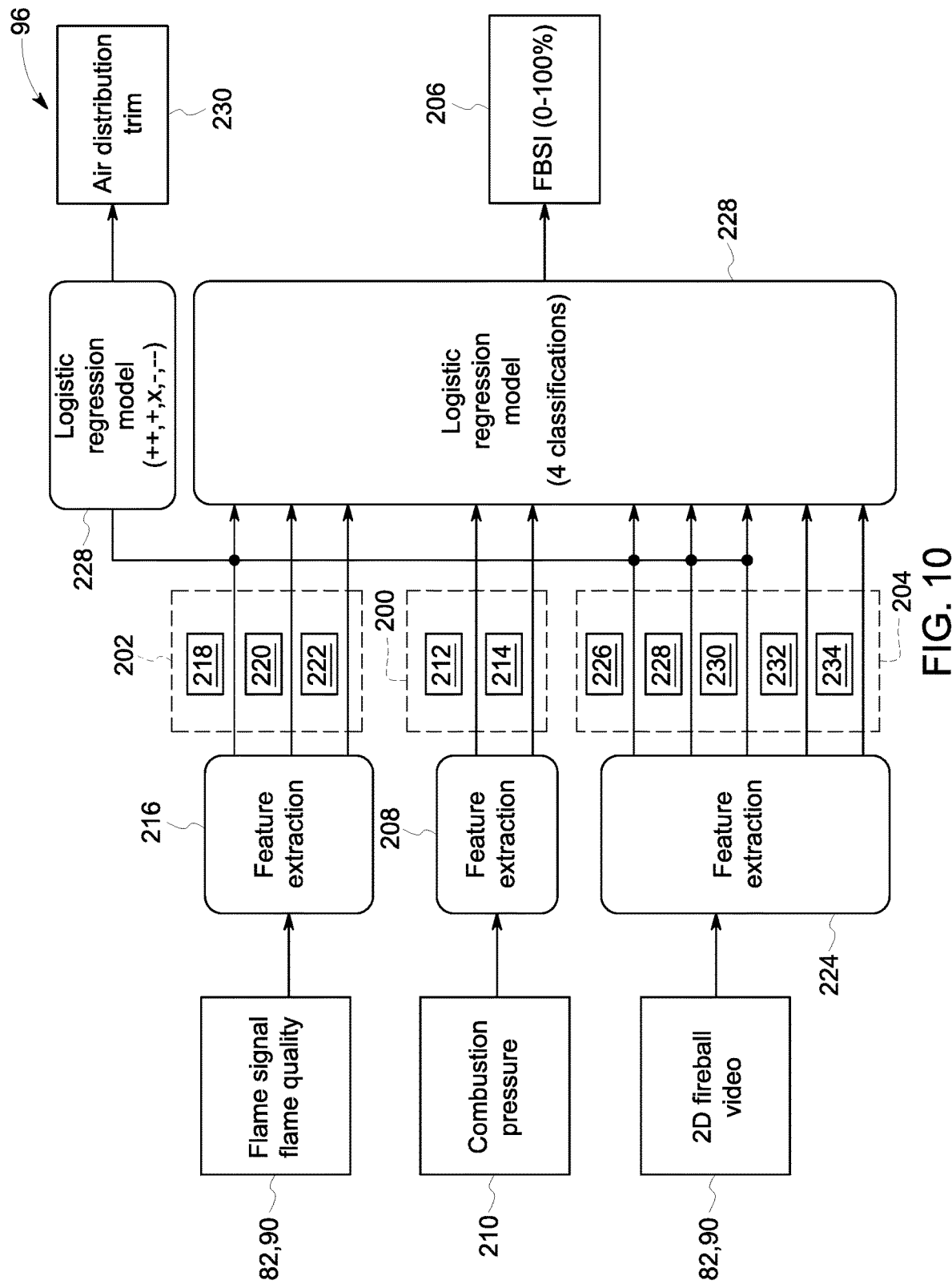
FIG. 10 is yet another flow chart depicting the method FIG. 4, in accordance with an embodiment of the present invention.

Turning to FIG. 10, in embodiments, the method 96 may include determining one or more pressure metrics 200, flame stability metrics 202, and/or one or more fireball metrics 204; and calculating/generating a fireball stability index 206 based at least in part on the one or more pressure metrics 200, flame stability metrics 202, and/or the fireball metrics 204. The flame stability index 206 provides an indication/measure/grade of the stability of the flame.

In such embodiments, the pressure metrics 200 may be acquired from one or more pressure readings and/or other feature extractions 208 obtained via one or more pressure sensors 210 (also shown in FIG. 1) disposed at various locations within the combustion chamber 12 (FIG. 1) and/or encompassing furnace/boiler 14 (FIG. 1) and/or power plant 16 (FIG. 1). Accordingly, the pressure metrics 200 may include a mean average pressure 212 of the one or more pressure readings and/or a standard deviation 214 of the one or more pressure readings.

Similarly, the flame stability metrics 202 may be acquired from one or more flame stability readings and/or other feature extractions 216 obtained via the flame stability sensors 82 (also shown in FIGS. 2 and 3) and/or 90 (also shown in FIG. 2). In embodiments, the flame stability metrics 202 may include a flame level 218, a peak-to-peak value 220, and/or a quality rating 222. The flame level 218 may be a scale/measure of flame stability, e.g., 0-100%. The peak-to-peak value 220 may be a quantitative metric that measures the distance between peaks in the flame stability index. The flame quality rating 222 may be a grading system of the quality of the flame, e.g., A-F, zero-to-one-hundred (0-100), etc.

The fireball metrics 204 may be acquired from one or more fireball readings and/or other feature extractions 224 obtained via one or more of the sensors 82 and/or 90. Accordingly, the fireball metrics 204 may include a size 226 of the fireball 50, one or more edge values 228 of the fireball 50, a flickering value 230, a smoke value 232, and/or an ash value 234. The fireball size 226, as used herein, refers to the effective diameter of the fireball 50. The edge values 228, as used herein, refer to the general location of the perimeter of the fireball 50. The flickering value 230, as used herein, refers to a quantitative metric that measures change in the intensity of the fireball 50. The smoke value 232, as used herein, refers to a quantitative metric that measures the amount of smoke, e.g., carbon particles, emitted by the fireball 50. The ash value 234, as used herein, refers to a quantitative metric that measures the amount/level of ash accumulative on surfaces within the combustion chamber 12 and/or encompassing power plant 16.

As shown in FIG. 10, the pressure metrics 200, flame stability metrics 202, and/or fireball metrics 204 may be fed to one or more logistic regression models 228 that determine the flame stability index 206 and/or an air distribution trim 230.

As will be understood, the flame stability index 206 may be used to determine whether the load of the combustion chamber 12 may be reduced in a safe manner, e.g., the controller 22 (FIG. 1) may reduce the operating load only when the flame stability index 206 is above a certain threshold. Accordingly, some embodiments of the present invention may be able to operate at a reduced load that is less than or equal to twenty percent (20%) of the normal operating load of the combustion chamber 12. As will be understood, the controller 22 may reduce the load on the combustion chamber 12 via adjusting one or more pulverizers 28 (FIG. 1) that feed fuel, e.g., coal, to one or more firing nozzles 42 (FIG. 2) and/or by reducing the amount of $O_2$ introduced into the combustion chamber via primary, secondary, or overfired air.

Finally, it is to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be executed in real-time. For example, as stated above, the system 10 may include at least one processor 24 and system memory/data storage structures 26 in the form of a controller 22 that electrically communicates with one or more of the components of the system 10. The memory may include random access memory ("RAM") and read-only memory ("ROM"). The at least one processor may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that provides for control over one or more of the various components of the system 10 may be read into a main memory of the at least one processor from a computer-readable medium. The term "computer-readable medium," as used herein, refers to any medium that provides or participates in providing instructions to the at least one processor 24 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes the at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a method for operating a combustion chamber is provided. The method includes obtaining a carbon monoxide reading at an exit of the combustion chamber via a carbon monoxide sensor, and deriving an oxygen set point trim based at least in part on the carbon monoxide reading and a carbon monoxide set point via a controller. The method further includes determining a stability status of the combustion chamber via a combustion stability sensor, and adjusting an oxygen set point of the combustion chamber with the oxygen set point trim based at least in part on the stability status via the controller. The oxygen set point defines a desired oxygen level at the exit of the combustion chamber. In certain embodiments, the combustion stability sensor is a flame stability sensor and the stability status is a flame status. In certain embodiments, the flame status indicates that a flame is present within the combustion chamber. In certain embodiments, the method further includes obtaining a nitrogen oxide reading at the exit of the combustion chamber via a nitrogen oxide sensor, deriving a stoichiometry set point trim based at least in part on the nitrogen oxide reading and a nitrogen oxide set point via the controller, and adjusting a stoichiometry set point with the stoichiometry set point trim based at least in part on the carbon monoxide reading via the controller. In such embodiments, the stoichiometry set point defines a desired stoichiometry of the combustion chamber. In certain embodiments, the method further includes adjusting one or more stoichiometries each corresponding to one of the firing nozzles of the plurality based at least in part on the stoichiometry set point. In certain embodiments, deriving an oxygen set point trim based at least in part on the carbon monoxide reading and a carbon monoxide set point is based at least in part on a predictive model. In certain embodiments, the predictive model is based at least in part on one of the carbon monoxide reading, a nitrogen oxide reading at the exit of the combustion chamber, and a temperature of steam generated by the combustion chamber. In certain embodiments, the stability status is a fireball stability index based at least in part a pressure metric, a flame stability metric, and a fireball metric.

Other embodiments provide for a method for operating a combustion chamber. The method includes detecting one or more stoichiometry imbalances between two or more firing nozzles of a plurality via two or more sensors each corresponding to one of the firing nozzles of the plurality. The method further includes adjusting a stoichiometry of at least one of the firing nozzles of the plurality via a controller based at least in part on the detected stoichiometry imbalances. In certain embodiments, the method further includes classifying the one or more stoichiometry imbalances into one or more groups via the controller. In such embodiments, adjusting a stoichiometry of at least one of the firing nozzles of the plurality via a controller based at least in part on the detected stoichiometric imbalances is further based at least in part on the one or more groups. In certain embodiments, all of the firing nozzles of the plurality are disposed in a same firing layer within the combustion chamber. In certain embodiments, adjusting a stoichiometry of at least one of the firing nozzles of the plurality via a controller based at least in part on the detected stoichiometric imbalances includes adjusting an air flow to at least one of the firing nozzles of the plurality via the controller. In certain embodiments, adjusting an air flow to at least one of the firing nozzles of the plurality includes adjusting an oxygen set point of the combustion chamber with an oxygen set point trim generated by the controller and based at least in part on the detected stoichiometric imbalances.

Yet still other embodiments provide for a method for operating a combustion chamber. The method includes determining a pressure metric of the combustion chamber via a pressure sensor, and determining one or more flame stability metrics for each of a plurality of firing nozzles of the combustion chamber via one or more flame stability sensors. The method further includes determining a fireball metric via a fireball sensor, and calculating a fireball stability index based at least in part on the pressure metric, the one or more flame stability metrics, and the fireball metric. In certain embodiments, the method further includes adjusting a stoichiometry of at least one of the firing nozzles of the plurality based at least in part on the fireball stability index. In certain embodiments, the method further includes reducing a load of the combustion chamber based at least in part on the fireball stability index. In certain embodiments, the load is reduced to less than or equal to twenty percent of the normal operating load of the combustion chamber. In certain embodiments, reducing a load of the combustion chamber includes adjusting one or more pulverizers that feed fuel to one or more of the firing nozzles of the plurality. In certain embodiments, determining a pressure metric of the combustion chamber via a pressure sensor includes obtaining one or more pressure readings of the combustion chamber via the pressure sensor. In such embodiments, the pressure metric includes at least one of a mean average pressure of one or more readings, and a standard deviation of one or more pressure readings. In certain embodiments, the one or more flame stability metrics include at least one of a flame level, a peak-to-peak value, and a quality rating.

Yet still other embodiments provide for a system for operating a combustion chamber. The system includes a carbon monoxide sensor, a combustion stability sensor, and a controller. The carbon monoxide sensor is operative to obtain a carbon monoxide reading at an exit of the combustion chamber. The combustion stability sensor is operative to determine a stability status of the combustion chamber. The controller is operative to derive an oxygen set point trim based at least on part on the carbon monoxide reading and a carbon monoxide set point; and adjust an oxygen set point of the combustion chamber with the oxygen set point trim based at least in part on the stability status, the oxygen set point defining a desired oxygen level at the exit of the combustion chamber.

Yet still other embodiments provide for a system for operating a combustion chamber. The system includes two or more sensors and a controller. The two or more sensors each correspond to a firing nozzle of a plurality firing nozzles disposed within the combustion chamber. The controller is operative to detect one or more stoichiometry imbalances between the two or more sensors, and to adjust a stoichiometry of at least one of the firing nozzles of the plurality based at least in part on the detected stoichiometry imbalances.

Yet still other embodiments provide for a system for operating a combustion chamber. The system includes a pressure sensor, one or more flame stability sensors, a fireball sensor, and a controller. The one or more flame stability sensors each correspond to one of a plurality of firing nozzles disposed within the combustion chamber. The controller is operative to determine a pressure metric of the combustion chamber via the pressure sensor, and to determine one or more flame stability metrics for each nozzle of the plurality. The controller is further operative to determine a fireball metric via the fireball sensor, and to calculate a fireball stability index based at least in part on the pressure metric, the one or more flame stability metrics, and the fireball metric.

Accordingly, by providing for a control design that incorporates various sensors that collect data regarding the stoichiometry and other relative variables associated with a combustion chamber, some embodiments of the invention may provide for a combustion chamber/boiler having optimized closed-loop control. Closed-loop control, in turn, enables such embodiments to drive excess air to a minimum value without violating one or more combustion constraints. Accordingly, such embodiments of the present invention provide for improved efficiency over traditional combustion chambers.

Additionally, by providing for lower reduced operating loads, than traditional combustion chambers, some embodiments of the present invention have lower NOx emissions, and/or provide for smaller sized boilers, than traditional combustion chambers. In particular, by detecting and correcting stoichiometric imbalances between one or more firing nozzles in a firing layer, some embodiments of the present invention prevent the sweeping of fuel from pulverizers remaining online during reduced load operations.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method for operating a combustion chamber comprising:
   obtaining a carbon monoxide reading at an exit of the combustion chamber via a carbon monoxide sensor;
   deriving an oxygen set point trim based at least in part on the carbon monoxide reading and a carbon monoxide set point via a controller;
   determining a stability status of the combustion chamber via a combustion stability sensor;
   via the combustion stability sensor, determining that the stability status of the combustion chamber is above a threshold indicating a stable combustion condition, and in response, adjusting an oxygen set point of the combustion chamber with the oxygen set point trim via the controller; and
   via the combustion stability sensor, determining that the stability status is below the threshold indicating a poor combustion condition, and in response, maintaining the oxygen set point at its prior value until the stability status is above the threshold;
   wherein the oxygen set point defines a desired oxygen level at the exit of the combustion chamber.

2. The method of claim 1, wherein the combustion stability sensor is a flame stability sensor and the stability status is a flame status.

3. The method of claim 2, wherein the flame status indicates that a flame is present within the combustion chamber.

4. The method of claim 1 further comprising:
   obtaining a nitrogen oxide reading at the exit of the combustion chamber via a nitrogen oxide sensor;
   deriving a stoichiometry set point trim based at least in part on the nitrogen oxide reading and a nitrogen oxide set point via the controller; and
   determining that the carbon monoxide reading is below a carbon monoxide threshold, and in response, adjusting a stoichiometry set point with the stoichiometry set point trim based at least in part on the carbon monoxide reading via the controller; and
   determining that the carbon monoxide reading is above the carbon monoxide threshold, and in response, holding the stoichiometry setpoint to its previous value until the carbon monoxide reading is below the carbon monoxide threshold;
   wherein the stoichiometry set point defines a desired stoichiometry of the combustion chamber;
   wherein the carbon dioxide reading is obtained continuously.

5. The method of claim 4 further comprising:
   adjusting one or more stoichiometries each corresponding to one of the firing nozzles of the plurality based at least in part on the stoichiometry set point.

6. The method of claim 1, wherein deriving an oxygen set point trim based at least in part on the carbon monoxide reading and a carbon monoxide set point is based at least in part on a predictive model.

7. The method of claim 6, wherein the predictive model is based at least in part on one of the carbon monoxide reading, a nitrogen oxide reading at the exit of the combustion chamber, and a temperature of steam generated by the combustion chamber.

8. The method of claim 1, wherein the stability status is a fireball stability index based at least in part a pressure metric, a flame stability metric, and a fireball metric.

9. A system for operating a combustion chamber comprising:
   a carbon monoxide sensor operative to obtain a continuous, real-time carbon monoxide reading at an exit of the combustion chamber;
   a combustion stability sensor operative to determine a continuous, real-time stability status of the combustion chamber; and
   a controller operative to:
      derive an oxygen set point trim based at least on part on the carbon monoxide reading and a carbon monoxide set point; and
      if the stability status is above a threshold indicating a stable combustion condition, adjust an oxygen set point of the combustion chamber with the oxygen set point trim; and
      if the stability status is below the threshold indicating a poor combustion condition, maintaining the oxygen set point at its prior value until the stability status is above the threshold;
      wherein the oxygen set point defines a desired oxygen level at the exit of the combustion chamber.

* * * * *